(12) United States Patent
Biles et al.

(10) Patent No.: US 8,001,331 B2
(45) Date of Patent: Aug. 16, 2011

(54) EFFICIENCY OF CACHE MEMORY OPERATIONS

(75) Inventors: Stuart David Biles, Little Thurlow (GB); Nigel Charles Paver, Austin, TX (US); Chander Sudanthi, Austin, TX (US); Timothy Charles Mace, Haverhill (GB)

(73) Assignee: ARM Limited, Cambridge (GB)

( * ) Notice: Subject to any disclaimer, the term of this patent is extended or adjusted under 35 U.S.C. 154(b) by 787 days.

(21) Appl. No.: 12/081,583

(22) Filed: Apr. 17, 2008

(65) Prior Publication Data
US 2009/0265514 A1    Oct. 22, 2009

(51) Int. Cl.
*G06F 12/00*  (2006.01)
(52) U.S. Cl. ........................................................ 711/133
(58) Field of Classification Search .................. None
See application file for complete search history.

(56) References Cited

U.S. PATENT DOCUMENTS

| 5,893,136 | A | * | 4/1999 | Stolt et al. ..................... 711/105 |
| 6,523,092 | B1 | | 2/2003 | Fanning |
| 7,020,751 | B2 | | 3/2006 | Kershaw |

FOREIGN PATENT DOCUMENTS
WO    2007/096572    8/2007

OTHER PUBLICATIONS

Lin, W. et al., "Reducing DRAM Latencies with an Integrated Memory Hierarchy Design", IEEE Computer Society, 12 pages, (2001).
Rixner, S. et al., "Memory Access Scheduling", Appears in ISCA-27, pp. 1-11, (2000).

* cited by examiner

*Primary Examiner* — Brian R Peugh
(74) *Attorney, Agent, or Firm* — Nixon & Vanderhye P.C.

(57) ABSTRACT

A processing system 1 including a memory 10 and a cache memory 4 is provided with a page status unit 40 for providing a cache controller with a page open indication indicating one or more open pages of data values in memory. At least one of one or more cache management operations performed by the cache controller is responsive to the page open indication so that the efficiency and/or speed of the processing system can be improved.

37 Claims, 6 Drawing Sheets

| Access scenario | Delay Indication Value |
|---|---|
| Page open | 4 |
| Page not open | 12 |
| ⋮ | ⋮ |

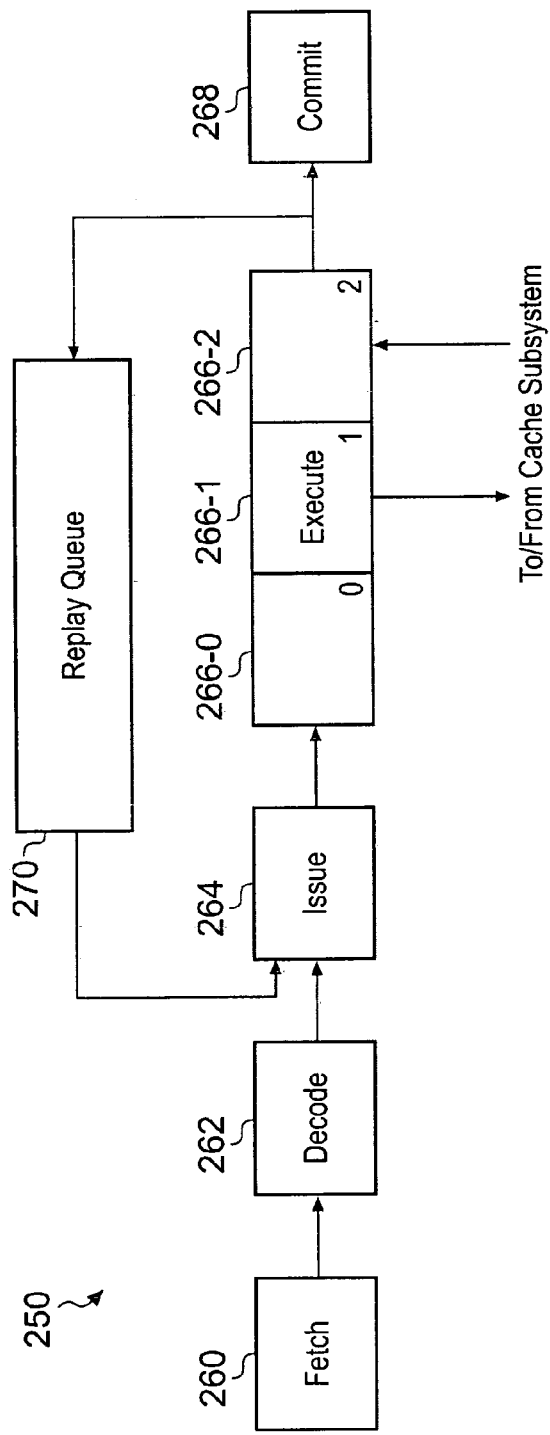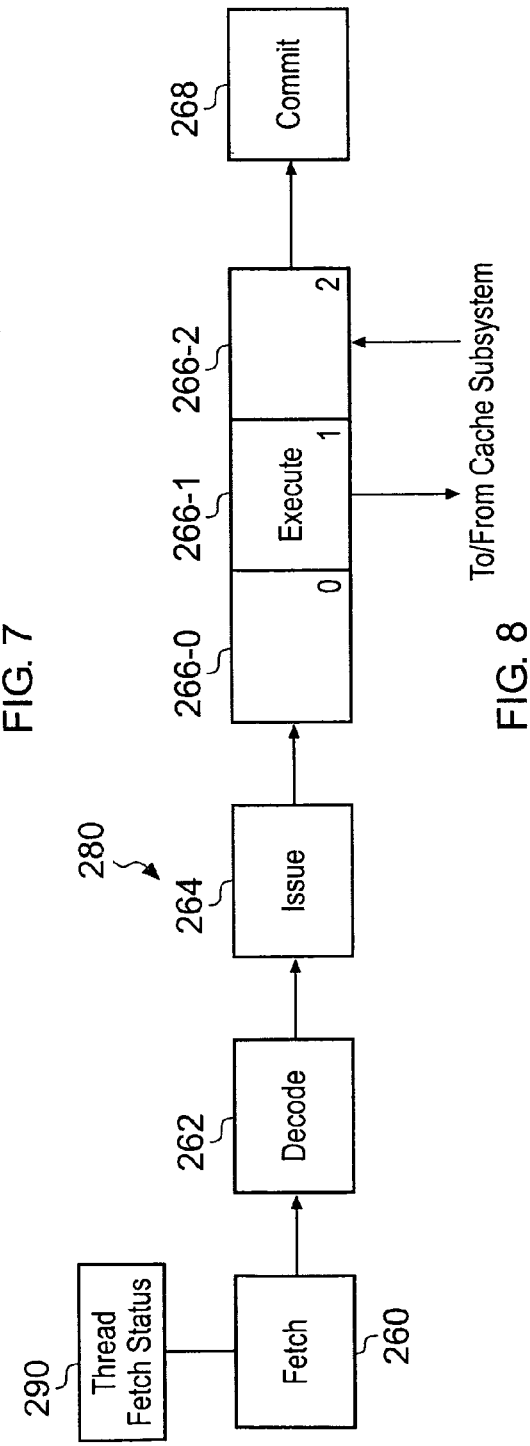

EFFICIENCY OF CACHE MEMORY OPERATIONS

BACKGROUND OF THE INVENTION

1. Field of the Invention

The present invention relates to data processing systems having cache memories. More particularly, the invention relates to improving the efficiency of cache memory operations.

2. Description of the Prior Art

Data processing systems, such as microprocessors, are typically provided with an external memory for storing data or instructions, and a cache memory for caching copies of some of the data or instructions stored in memory (hereafter "data" stored in the memory or the cache can refer to either or both of data and instructions). The cache memory improves processor performance by storing data locally, so it is quicker and more efficient for the processor to access data in the cache than data in external memory. The cache stores less data than the external memory, and so, if the processor requires data that is not held in the cache, then the required data is loaded from memory into the cache before being used by the processor (these occurrences are known as a cache miss and a cache fill). It may take several cycles for the data to be fetched from memory. Also, if all the cache lines within the cache already contain data, then a cache line will need to be selected for eviction and the data within that cache line written back to memory. Thus, the efficiency of the cache memory can be dependent upon the state of the external memory when data is fetched or written back.

One system which takes the state of the external memory into account when replacing cache lines is described in U.S. Pat. No. 6,523,092 B1. This system avoids memory thrashing by comparing a memory request address with cache tags to determine if any cache entries in the cache match the address. If a cache tag of an entry does match, then allocation to that cache entry is discouraged and an alternative victim is selected. Similarly, U.S. Pat. No. 7,020,751 B2 describes a system in which one of the criteria used by a cache victim select circuit to select a victim cache line is whether or not a bank of DRAM is busy. Cache storage lines requiring a write back to a non-busy DRAM bank are selected in preference to cached storage lines requiring a write back to a busy DRAM bank. Both of these prior art systems discourage performing cache operations which involve active areas in memory.

"Memory Access Scheduling" by Scott Rixner, William J. Dally, Ujval J. Kapasi, Peter Mattson and John D. Owens recognises that the bandwidth and latency of a memory system are dependent upon the manner in which memory accesses interact with the "3-D" structure of banks, rows, and columns characteristic of contemporary DRAM chips. Sequential accesses within the same row of DRAM have low latency compared to accesses to different rows, and so memory system performance can be improved by scheduling memory accesses so that accesses to the same row are performed sequentially.

The present techniques seek to improve the efficiency and/or speed of operation of data processing systems having a cache memory.

SUMMARY OF THE INVENTION

Viewed from one aspect, the present invention provides a data processing apparatus comprising:

a memory providing access to data values via one or more pages of data values, a memory access to a data value in a not open page triggering said not open page to be opened before said data value is accessed;

a cache memory coupled to said memory and having a plurality of cache lines for caching data values stored in said memory;

a cache controller configured to control said cache memory by performing one or more cache management operations; and a page status unit coupled to said cache controller and configured to provide a page open indication to said cache controller; wherein at least one of said one or more cache management operations performed by said cache controller is responsive to said page open indication provided by said page status unit.

Data values are stored in one or more pages within external memory. Before a data value may be accessed, the page containing that data value should be open. This means that accessing data in a page that is already open is quicker than accessing data in a not already open page, because there will be a delay of some cycles while the unopened page is being opened. The present technique realizes that as some cache management operations performed by the cache involve writing or fetching data to or from memory, the efficiency of the cache memory can be improved by biasing these operations depending on which pages in memory are or will be open. This is done by providing the system with a page status unit that provides a page open indication to the cache controller. Thus, the cache controller can have knowledge of which pages in memory are likely to be open and bias its cache management operations so that an already open page is more likely to be used than an unopen page.

The page open indication can indicate one or more open pages of data values. In this way, the cache controller will have knowledge of which pages in memory are likely to be open and can perform its cache management operations more efficiently by giving preference to operations that involve accesses to open pages.

The cache management operations can take a wide variety of different forms. In one embodiment of the present technique, at least one of said one or more cache management operations performed by said cache controller is a victim selection operation responsive to said page open indication to select for eviction from said cache memory a victim cache line from among a plurality of candidate cache lines.

Sometimes, for example when a cache miss occurs, data within the cache needs to be evicted to allow other data to be cached. In this case, the cache controller selects a victim cache line from amongst a plurality of candidate cache lines. If the cache line is dirty (that is, the data in the cache line is not the same as the corresponding data in memory), then the victim data will need to be written back to memory. By being responsive to the page open indication, the cache controller can select as a victim a candidate cache line that is likely to give a better system performance compared with other candidate cache lines.

When selecting said victim cache line said cache controller can be responsive to said page open indication to select a candidate cache line that is dirty and stores data values to be written back to a page indicated as open in preference to a candidate cache line that is dirty and stores data values to be written back to a page indicated as not open.

If the cache controller selects a dirty cache line that stores data values which are to be written back to a page in memory that is indicated as being open, then the delay associated with the memory access will tend to be shorter than if the cache controller selects a cache line that corresponds to a page not indicated as being open. The delay associated with the memory write back can therefore be reduced by biasing victim selection towards selecting candidate lines that will need a write back to an open page. This improves the processing efficiency of the system.

When selecting said victim cache line said cache controller can also be responsive to at least one of:

(i) how recently a candidate cache line has been used by said data processing apparatus; and (ii) whether a candidate cache line is clean or dirty.

Whether a memory page is open or not need not be the only criterion for selecting victim cache lines. It would be disadvantageous to evict cache lines which are often used by the processor, as it would be likely that the data in these cache lines would need to be reloaded into the cache later. Also, if clean cache lines are selected, then there is no need for a write-back operation. Thus, the victim selection operation can take into account several selection criteria, with varying degrees of importance according to the preference of the user and the requirements of the system.

In another embodiment, at least one of said one or more cache management operations performed by said cache controller is a cache cleaning operation responsive to said page open indication to select at least one dirty cache line from among said plurality of cache lines and returning said dirty cache line to a clean state with respect to said memory.

A clean cache line is a cache line for which the corresponding data in memory is the same as the cached copy. A dirty cache line is a cache line containing data which has been changed by the system since it was loaded from memory, so that the data in memory is different to the cached data. Unlike a clean cache line, if a dirty cache line needs to be evicted, then this will require a write back to memory. Thus, if the cache controller performs a cache cleaning operation to return a dirty cache line to a clean state by writing the data back to memory, then this can obviate the need for a write back in the future. The cache cleaning operation can be made more efficient by being sensitive to the status of pages within memory as indicated by the page status unit.

When selecting said dirty cache line said cache controller can be responsive to said page open indication to select a cache line that is dirty and stores data values to be written back to a page indicated as open in preference to a cache line that is dirty and stores data values to be written back to a page indicated as not open.

Thus, the cache cleaning operation can choose a dirty cache line for eviction which is likely to trigger a write back to an already open page, and so this will incur less latency than if a dirty cache line corresponding to an unopened page was selected.

While it will be appreciated that the cache cleaning operation could be performed at any time, it is particularly advantageous when the cache controller performs said cache cleaning operation when said cache controller does not have another cache management operation to perform.

Thus, the cache controller may make use of any free cycles to check for open pages and detect whether any cache lines refer to that page. Thus, the cache controller can trigger a write back to memory, returning a cache line to a clean state, and obviating the need for a write back at some point in the future, when there may be a more pressing demands on the processing capacity of the cache controller and the bandwidth between the cache and the external memory. Thus, the efficiency of the cache system can be improved.

Another possibility is that said cache controller performs said cache cleaning operation if, while performing a cache lookup operation, said cache controller detects at least one cache line that is dirty and stores data values to be written back to a page indicated as open.

In the course of a normal cache lookup sequence, the cache controller will naturally gain visibility to tag values. These tag values will typically contain address tag and dirty status information. By combining this information with the page open indication, the cache controller can detect that a particular cache line is dirty and corresponds to an open page in memory. In this case it may be advantageous to perform a cleaning operation on that cache line.

The cache controller may also perform said cache cleaning operation by sweeping said cache lines periodically to check for dirty cache lines.

If a line is clean and a parity error is detected, then the error can be fixed by reloading that cache line from memory. However, if the line is dirty then there may be an unrecoverable error. Hence, in some known cache systems the cache controller regularly sweeps cache lines to check for dirty cache lines. This periodic sweeping of cache lines can be modified to use the present technique so that the cache controller preferentially selects cache lines which trigger a write back to an open page in memory over other cache lines.

The data processing system may further comprise a memory controller configured to control said memory, wherein said page status unit is coupled to said memory controller and maintains said page open indication by monitoring which pages have been opened when said memory controller responds to memory access requests.

Alternatively, said page status unit may be coupled to said cache controller and maintain said page open indication by keeping a record of which of said plurality of pages have been opened by said memory on behalf of said cache controller.

In some embodiments, said page open indication may give an imprecise indication of one or more open pages of data values.

It may not be necessary for the page open indication to precisely indicate whether each of the pages in memory is open or closed. In some cases more processing power may be required to keep an accurate record of page status than would be gained from the resulting saving in efficiency. Thus, it may be more beneficial to provide only an approximate indication of open pages. Also, if the indication was precise, a situation might arise where a particular cache line is never selected for eviction or cleaned because the page it refers to is never opened. This may mean that the number of useful cache lines in the cache memory is effectively reduced. Eventually, it might be necessary to force cleaning or eviction of that cache line even though this may be costly. An imprecise page status indication could reduce the likelihood that a particular cache line is never selected.

The page open indication may be generated using a hash function performed upon addresses of open pages.

A hash function could be performed upon addresses of open pages. This would mean that less information needs to be passed between the page status unit and the cache controller than if the addresses themselves were used as the page open indication. The hash function might be imprecise as false hits could arise.

One way in which the page open indication could give an imprecise indication of which of said plurality of pages are already open is when there is a time lag between a page being opened or closed and said page status information indicating said page being opened or closed being received from said page status unit by said cache controller. This situation would be most likely to arise when the page status unit monitors which pages have been opened by the memory controller in response to memory access requests.

Alternatively, said memory may be accessible by one or more devices other than said cache controller, in which case said page open indication may give an imprecise indication of which of said plurality of pages are open when said memory opens one or more pages in response to memory accesses from said one or more devices. This situation could arise when the page status unit maintains the page open indication by keeping a record of which pages are opened on behalf of the cache controller.

To address this problem, the page status unit may also be responsive to memory accesses from said one or more devices to maintain said page open indication. Thus, the page status unit can be sensitive to accesses from other agents in the system and maintain more accurate page status information.

In another embodiment, the system further comprises processing circuitry configured to perform a sequence of processing operations, wherein at least one of said one or more cache management operations performed by said cache controller is a memory access delay prediction operation responsive to said page open indication to predict a delay time required for a memory access to be completed; and said processing circuitry schedules at least some processing operations in dependence upon said delay time predicted by said cache controller.

This technique realizes that the cache controller can use the page open indication provided by the page status unit to make a quantitative prediction of how long a memory access will take, depending on whether an open or an unopen page in memory is accessed. The memory access delay prediction made by the cache controller can also be used by other components of the system. A processor performs a sequence of processing operations, some of which may use data stored the cache or memory. If data needs to be fetched from memory, then a delay of several clock cycles may result. In known systems there can be a latency between a memory system indicating that a memory access is complete and the processing system responding to the indication or being able to process the data. In the present technique, the cache controller's prediction of the delay time can be provided to the processor, which can schedule its processing operations accordingly to make better use of its processing capacity. Thus, the efficiency of the system can be improved. It will be appreciated that the processing circuitry could be any circuitry capable of receiving data and processing the data.

The system may have a delay indication unit coupled to said cache controller for providing a delay indication value in response to said page open indication. Thus, the cache controller can refer to the delay indication unit to obtain a delay indication value, using which the cache controller can make its prediction of a delay time.

The delay indication unit can have a plurality of entries each containing a delay indication value corresponding to a respective access scenario and said cache controller selects one of said entries in response to said page open indication to predict said delay time.

Each of the access scenarios could correspond to different pages in memory, and whether pages are open or closed. The cache memory can use the page open indication provided by the page status unit to select one of the entries corresponding to the current access scenario. The access scenario could be dependent upon the particular page being accessed as well as the page open indication.

One possibility is that the delay indication value is a value indicating the number of cycles a memory access is predicted to take. The cache controller, or other components in the system, can then arrange processing operations to start at a time such that the operation which makes use of the data is ready to receive the data a certain number of cycles later, the number of cycles being given by the delay indication value.

The plurality of entries within the delay indication unit could contain hardwired delay indication values.

Instead, the plurality of entries could contain programmable delay indication values. Thus, the user would be able to program predicted delay values depending on the system specifications.

Another option is that the plurality of entries contain delay indication values which may be dynamically adjusted based on measured delay times of previous memory accesses. For example, this adjustment could be performed by the cache controller. In this way, the predicted delay times may more accurately reflect the actual delay.

One possible example is where the delay indication unit has two entries respectively corresponding to a page open scenario and a page not open scenario. In this case, the selection of which entry to use is wholly dependent upon the page open indication provided by the page status unit.

Although the skilled person will appreciate that the present technique is generally applicable, it may be particularly useful when said processing circuitry comprises a processing pipeline comprising a plurality of pipeline stages. In this case the processing circuitry may schedule said processing operations such that a processing operation that consumes data is predicted to reach an execution stage where the data fetched from memory is consumed by the time that said memory access is complete.

For each processing operation, it may be necessary to perform a number of steps before data returned from the memory system can be consumed by the processing operation. Thus, if an early indication is available predicting when completion of the memory access will occur, the processor can arrange that pipeline stages preceding the execution stage where the data is consumed are started before the memory access completes. Preferably, the processing operation will reach the execution stage at the same time as the data is returned from memory. This reduces the length of time for which the pipeline is stalled while data is being fetched from memory, improving the efficiency of the system.

In one example, a cache miss triggering processing operation that triggers a cache miss is placed in a replay queue and said processor is responsive to said predicted delay time to reissue said cache miss triggering processing operation at an issue stage of said processing pipeline at a time such that said cache miss triggering processing operation is predicted to reach said execution stage of said processing pipeline by the time that said memory access is predicted as being complete.

One situation that may result in data being fetched from memory is a cache miss. If a cache miss is encountered, the operation that triggered the cache miss is held in a replay queue while the missing cache line is loaded from memory. The cache controller provides the processor with a predicted delay time dependent upon whether or not the page being accessed is indicated as being open. Later, the processor reissues the cache miss triggering operation at an issue stage of the pipeline at a time at which it is predicted that the cache miss triggering processing operation will reach the execution stage of the pipeline (where it can process the loaded data) by the time that the memory access is predicted to be complete.

Thus, the additional latency between the true completion of the memory access and the consumption of the data by the processor is reduced.

At least some processing operations subsequent to said cache miss triggering processing operation may be executed while said cache miss triggering processing operation is held in said replay queue.

This means that the pipeline is not stalled while the cache miss is being dealt with by the cache memory and external memory systems. The processor can continue to process other operations (provided that these operations are not dependent upon the result of the cache miss triggering operation). Thus, the processor can reschedule its operations to increase the throughput of operations through the pipeline.

If said memory access is not complete when said cache miss triggering processing operation reaches said execution stage of said processing pipeline then said cache miss triggering processing operation can be placed in said replay queue again.

The skilled person will appreciate that the prediction of the delay time may not be correct. If a misprediction results in the processing operation reaching the execution stage before the memory access is complete, then the processing operation may be placed in the replay queue again, and can be reissued at a later time. If the delay indication values in the delay indication unit are dynamically adjustable, then the system may be able to adapt in response to mispredictions so that it is able to provide better predictions in the future. Also, as the processor is able to process other operations while the cache miss triggering operation is held in the replay queue, it can be more efficient to send this operation through the replay queue again rather than allowing it to stall the pipeline.

The present technique may also be useful in situations where said processor is configured to perform processing operations from a plurality of threads of processing so that if a processing operation from one thread triggers a cache miss then said one thread enters a pending state and said processor performs processing operations from another thread; and said one thread exits said pending state at a time dependent upon said delay time predicted by said cache controller.

Some multithreading processors can perform processing operations from several threads of processing. The processor may select how to divide its processing capacity between the different threads. In the event of a cache miss on a particular thread, that thread can be held in a pending state while other threads are processed. Once the cache miss has been resolved, the pending thread can be removed from the pending state and resume execution. The system can arrange for the cache miss triggering thread to exit the pending state at a time depending on the predicted delay time (based upon whether the cache miss accesses an open page or not) so that the latency arising from the cache miss is reduced.

When said one thread enters said pending state then processing operations from said one thread can be flushed from said processing pipeline. Thus, this frees the processing pipeline and allows it to be able to process operations from other threads.

In one example, said one thread exits said pending state when processing operations of said one thread are refetched into a fetch stage of said processing pipeline at a time such that said processing operations are predicted to reach said execution stage of said processing pipeline by the time that said memory access is predicted as being complete.

The processor can use the delay time predicted by the cache controller on the basis of the page open indication to determine at what time processing of the cache miss triggering thread should be restarted so that processing operations of that thread are likely to reach the pipeline stage where the fetched data is consumed concurrently with the data being available to be processed. Thus, some preceding pipeline stages which need to be processed before the execution stage is reached can be performed while the data is still being loaded from memory, and the latency arising from the cache miss can be reduced by the time taken to process these preceding stages.

The page open indication could also indicate one or more pages that are predicted to be open in the future.

As well as using a page open indication that indicates currently open pages, the cache management operations described before could also use a page open indication that is a prediction of pages that will be open in the future to improve efficiency. For example, when one cache line is selected for eviction or cleaning, but before the data in the cache line has been written back to memory, the cache controller could set the page open indication to indicate that the page in memory corresponding to that cache line is predicted to be open in the future. The victim selection, cache cleaning or memory access delay prediction operations could then use the page open indication to preferentially select cache lines that correspond to pages predicted as being open in the future or schedule operations in accordance with when the pages are predicted to be open.

The page open indication could indicate one or more of said plurality of cache lines that correspond to one of:
 a currently open page; and
 a page that is predicted to be open in the future.

Rather than directly identifying open pages in memory, the page open indication could instead identify one or more cache lines that correspond to an open page or a page predicted as being open in the future. For example, when one cache line is selected for eviction or cleaning, then other cache lines that correspond to the same page as the selected line could be selected in preference to cache lines that access other pages in memory. The cache controller could compare other cache lines against the cache line that has already been selected to see whether they access the same page or not.

In a further feature, the system can comprise a memory controller configured to control said memory; wherein:
 said memory controller uses a first addressing system to identify memory locations within said memory;
 said cache controller uses a second addressing system to identify memory locations within said memory; and
 at least one of said memory controller, said page status unit, and said cache controller performs a mapping between addresses in said first addressing system and addresses in said second addressing system so that said cache controller can identify cache lines that correspond to a page indicated by said page open indication.

The physical address used by the cache system may go through a level of reordering before being used as an address to control DRAM chips in memory. Sequential addresses used by the cache system do not necessarily refer to adjacent memory locations in memory. This might be done to allow sequential memory addresses to be performed concurrently. For example, when performing two accesses to sequential addresses are required by the system, then if these addresses refer to adjacent locations within a single DRAM chip, then the two accesses would be processed one after the other. However, if the sequential addresses used by the system are mapped to memory locations in separate DRAM chips, then the two accesses could be performed simultaneously, reducing the access time. When the cache controller and the memory controller use different addressing systems, then at least one of the memory controller, the page status unit, and the cache controller performs a mapping between addresses in the two addressing systems so that the cache controller can identify cache lines that correspond to a page indicated by the page open indication.

Viewed from another aspect, the present invention provides a data processing method comprising the steps of:

providing access to data values stored in a memory via one or more pages of data values, a memory access to a data value in a not open page triggering said not open page to be opened before said data value is accessed;

caching at least some of said data values stored in said memory in a cache memory having a plurality of cache lines;

controlling said cache memory by performing one or more cache management operations using a cache controller; and providing a page open indication to said controlling step; wherein at least one of said one or more cache management operations performed by said controlling step is responsive to said page open indication provided in said providing step.

Viewed from a farther aspect, the present invention provides a data processing apparatus comprising:

memory means for providing access to data values via one or more pages of data values, a memory access to a data value in a not open page triggering said not open page to be opened before said data value is accessed;

cache memory means coupled to said memory means having a plurality of cache lines for caching data values stored in said memory;

cache controlling means for controlling said cache memory means by performing one or more cache management operations; and page status means coupled to said cache controlling means for providing a page open indication to said cache controlling means; wherein at least one of said one or more cache management operations performed by said cache controlling means is responsive to said page open indication provided by said page status means.

BRIEF DESCRIPTION OF DRAWINGS

FIG. 7 shows a processing pipeline employing a replay queue mechanism for dealing with cache misses; and FIG. 8 illustrates a processing pipeline for a multithreading processor.

DESCRIPTION OF PREFERRED EMBODIMENTS

Figure 1:
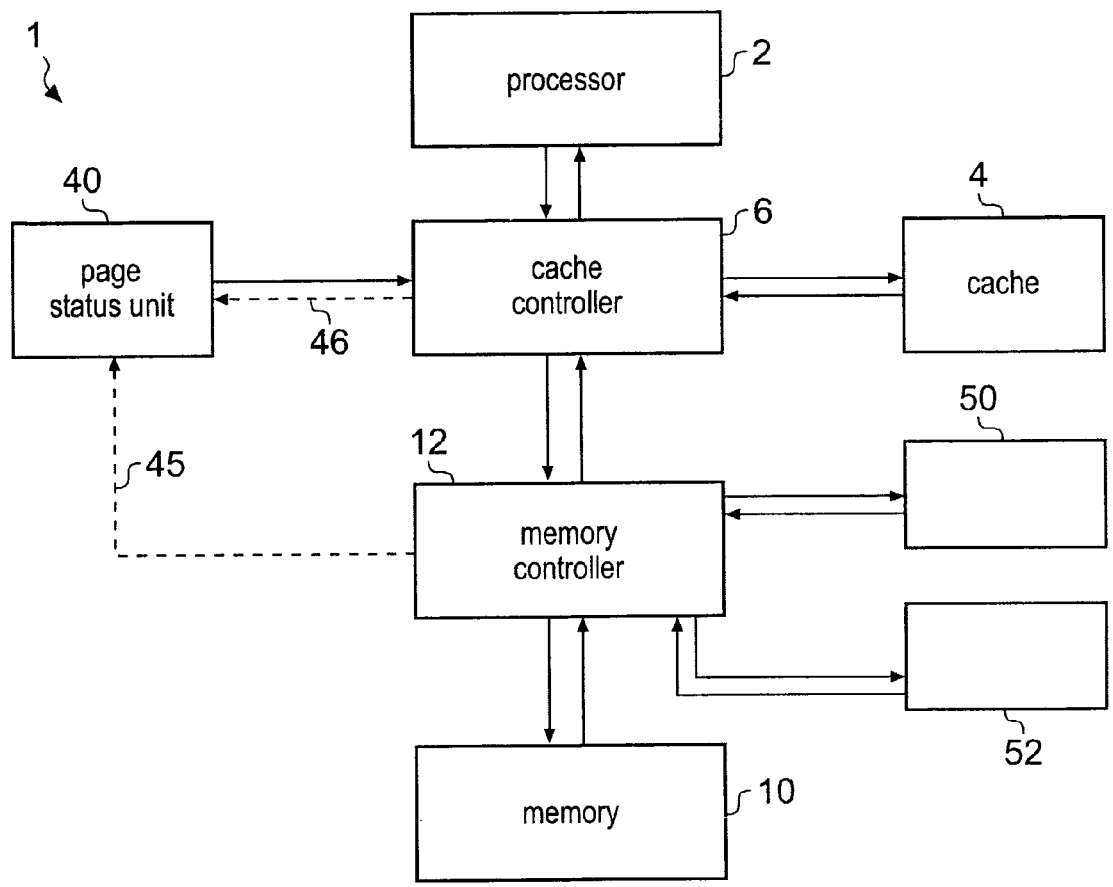
FIG. 1 schematically illustrates a data processing system including a processor core and a cache memory.

FIG. 1 schematically illustrates a data processing system 1 including a processor core 2 and a cache memory 4. The processor 2 could be a programmable CPU, or any other device capable of receiving data and processing it. A cache controller 6 for controlling the cache memory 4 is provided between the processor 2 and the cache memory 4. Data and signals passed between the processor 2 and the cache memory 4 are sent via the cache controller 6. The processing system 1 also includes a memory 10. The memory 10 is controlled using a memory controller 12. Data and signals passed between the cache controller and the memory are sent via the memory controller 12. Memory access requests from the processor are forwarded to the memory controller 12 by the cache controller 6. The processor 2, cache memory 4, cache controller 6, memory 10 and memory controller 12 are connected by various buses. The processing system 1 could be provided as, for example, an integrated circuit. It will be appreciated that the processing system 1 could contain other components not illustrated in FIG. 1, which for sake of clarity have been omitted.

Figure 2:
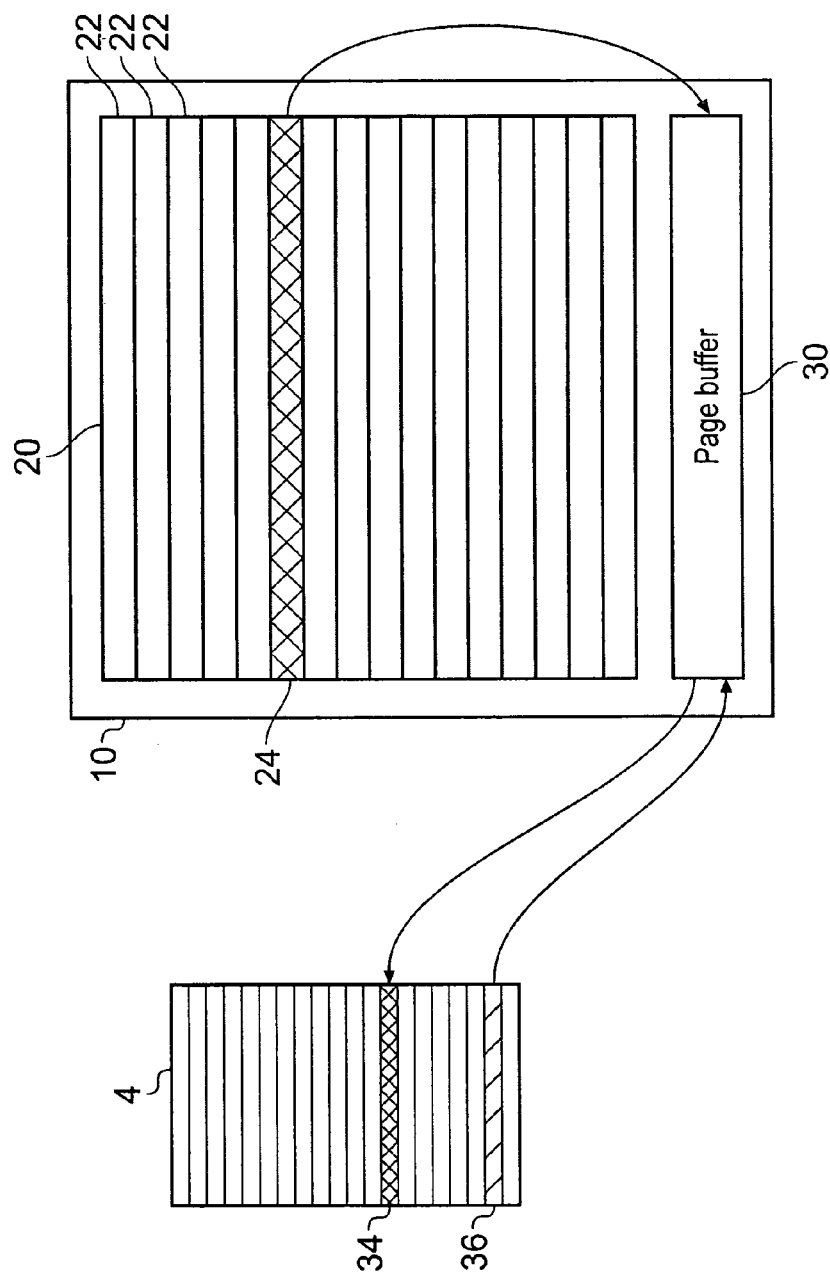
FIG. 2 illustrates how a memory can provide access to data values.

The memory 10 is a dynamic random access memory (DRAM). FIG. 2 illustrates how the memory 10 provides access to data values. Memory 10 has at least one bank 20 of memory cells, memory cells within the bank 10 being arranged in rows 22. For simplicity, the memory 10 in FIG. 2 is illustrated as having one bank 20, but there would normally be more DRAM banks.

Access to data values stored in the memory 10 is provided via one or more pages of data values. When a data value is accessed the page containing that data value is loaded into a page buffer 30, from which the memory controller 12 may read the data and pass it to other devices within the system. In the example shown in FIG. 2, a page corresponds to a row of memory cells within the bank 10, and so, if a data value within row (page) 24 is required, then this page is loaded into the page buffer 30 before the data value is read.

While in the example shown in FIG. 2 a row of memory cells corresponds to a page of data values, this is not necessarily the case. A page could correspond to more than one row, or alternatively a row could correspond to more than one page. The page buffer 30 may be able to store more than one page of data.

If a data value within a page that has not previously been accessed is required, then that page needs to be loaded into the page buffer 30 before the data can be read (or written to). Also, to release space within the page buffer 30 a page that has previously been loaded into the page buffer may need to be written back to the memory cells in the memory bank 20. This may take a number of clock cycles. However, if the page being accessed is already present in the page buffer 30, then it is not necessary to transfer data between the page buffer 30 and the memory bank 20 and so the delay is reduced. Pages present in the page buffer 30 are known as open pages. Pages of data values that are not present in the page buffer 30 are known as unopen, or closed pages.

When data is loaded into the cache 4, then the data is read from the page buffer 30 in memory 10 and stored in a cache line 34 in the cache 4. Similarly, when data is evicted from the cache 4, the data cached in the victim cache line 36 is returned to the page buffer 30 in memory 10. As the delay time required for a memory access to be complete is greater for an access to an unopen page than for an access to an open page, the efficiency of operations in the cache controller 6 can be improved if the cache controller 6 biases these operations so that operations that trigger an access to an already open page are more likely to be performed than operations that trigger accesses to pages that are not already open. Thus, the processing system 1 illustrated in FIG. 1 is provided with a page status unit 40 that provides the cache controller 6 with a page open indication indicating one or more open pages in memory. Cache management operations performed by the cache controller 6 are responsive to this information provided by the page status unit 40 so as to improve the efficiency of the cache controller with respect to external memory.

The page status unit 40 may maintain its page open indication in different ways. One possibility is that the page status unit 40 is coupled to the memory controller 12 along data path 45 so that the page status unit 40 can monitor which pages in memory 10 have been opened as a result of memory access requests sent to the memory controller 12. An alternative is that the page status unit is that the cache controller 6 can use data path 46 to inform the page status unit 40 of which pages in memory 10 have been opened on behalf of the cache controller 6. One possible way of providing the page open indication is by performing a hash function on the addresses of open pages in memory 10 and providing the result of the hash function to the cache controller 6. This would mean that less data needs to be passed from the page status unit 40 to the cache controller 6.

The page status unit 40 could also provide the page open indication by identifying one or more cache lines that correspond to an open page in memory. In this case, rather than having to determine whether tag address data corresponds to an open page or not, the cache controller 6 could compare a cache line indicated as corresponding to an open page with other cache lines to determine whether the other cache lines also correspond to an open page.

The page open indication need not be wholly accurate. An imprecise indication of which pages are open may be enough to be able to improve the efficiency of the cache memory, without requiring a large amount of processing to maintain accurate information. Also, the page open indication may become imprecise due to the layout of the system. For example, there may be a delay between a page being opened or closed in memory 10 and the page open indication being received from the page status unit 40 by the cache controller 6. Alternatively, in the case where the page open information is maintained based on which pages have been opened on behalf of the cache controller, there may be other devices 50, 52 within the processing system 1 which also access data in memory 10 and have triggered pages to be opened. To address this problem, the page status unit 40 could be adapted to be responsive to the other devices 50, 52 as well.

The page open indication could also indicate pages that are predicted as being open in the future. For example, when a cache line is selected for write back to memory, but before the data is actually written back, then the page associated with the selected cache line could be predicted as being open in the future. This future indication could then be used by the cache controller to select or schedule its cache management operations more efficiently. Hereafter, for conciseness the cache management operations will be described using the example where the page open indication indicates currently open pages. However, it will be appreciated that the cache management operations could use the page open indication that indicates pages predicted as being open, or could use both types of page open indication.

The system of physical addressing used to address memory locations within the memory 10 may not be the same as the addressing system used by the cache controller 6, such that consecutive addresses used by the cache controller may not refer to adjacent locations in the DRAM memory 10. If this is the case, then at least one of the memory controller 12, the cache controller 6 and the page status unit 40 can perform a mapping between the two addressing systems so that the cache controller 6 can identify whether cache lines correspond to the same page as a page indicated as open or predicted to be open by the page open indication. The mapping could be system configured or could be configured at boot time.

The cache controller 6 performs a range of cache management operations for controlling the cache 4 and controlling how the cache 4 interacts with the processor 2 and the memory controller 12. Several of these cache management operations can be made responsive to the indication provided by the page status unit 40 in order to reduce the time taken for these operations or improve the efficiency of system operations.

One such operation is a victim selection operation. Occasionally, the cache controller 6 will need to free up space in the cache 4 for other data to be stored. One example of such a situation could be a cache miss, when the processor requests data that is not currently cached and must be fetched from memory. Therefore, the cache controller 6 selects a victim cache line for eviction from the cache 4. If the victim cache line is dirty then this will require the victim data to be written back to memory. Thus, the cache controller 6 uses the page open indication provided by the page status unit 40 to bias its victim selection operation so that a dirty cache line that triggers data to be written back to a page indicated as being open is selected in preference to a dirty cache line that corresponds to a page not indicated as being open. By discouraging eviction to unopened pages, the time taken for the victim data to be written back to memory is more likely to be short than if the cache controller 6 did not bias its victim selection according to which pages are open.

Figure 3:
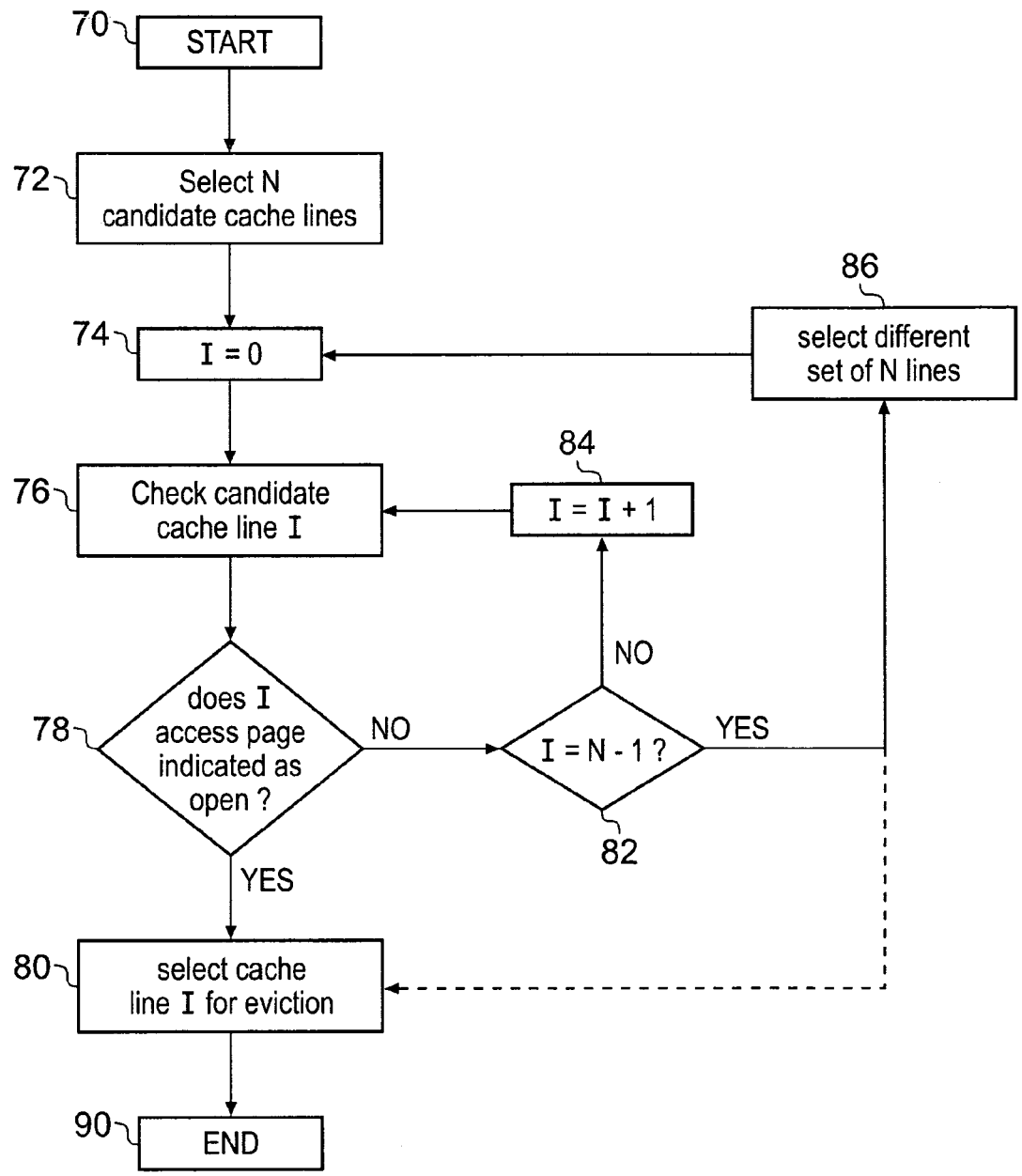
FIG. 3 shows a flow chart demonstrating an example of a victim selection algorithm according to the present technique.

FIG. 3 shows a flow chart demonstrating one example of a victim selection algorithm that uses the present technique. The victim selection algorithm begins at step 70. At step 72, the cache controller 6 selects a set of N dirty candidate cache lines from among the cache lines of the cache 4. N is an integer that is less than or equal to the number of cache lines in, the cache 4. The candidate cache lines could be selected using, for example, round robin, random, least recently used (LRU) or tournament selection methods. Once the candidate cache lines have been selected, flow passes to step 74, where a counter I is set to zero (the counter I can later have values $0 \leq I \leq N-1$). Then, in step 76 the cache controller 6 checks candidate cache line I to detect which memory page would be accessed if cache line I was selected for eviction. At step 78, the cache controller detects whether or not the corresponding memory page is indicated as being open by the page open indication provided by the page status unit 40. If the corresponding memory page is indicated as being open, then flow proceeds to step 80, where the cache controller 6 selects the candidate cache line I as the victim cache line. The process then ends at step 90. The cache controller 6 is now ready to perform an eviction.

Alternatively, if at step 78 the cache controller 6 detects that the memory page corresponding to candidate cache line I is not indicated as being open, then flow proceeds to step 82, where the cache controller 6 detects whether or not the counter I equals N−1. If I does not equal N−1, then at step 84 the counter I is incremented, and flow returns to step 76, where the cache controller 6 checks the following candidate cache line. On the other hand, if at step 82 I does equal N−1, then this means that all N candidate cache lines have been checked already and all of the candidate cache lines correspond to closed memory pages. Flow then proceeds to step 86, where the cache controller 6 selects a different set of N cache lines, perhaps relaxing the selection criteria. As an alternative to step 86, flow could also proceed to step 80, where cache line I is selected for eviction anyway, even though it accesses a page that is not open (see the dotted line in FIG. 3). This may be preferable if choosing another set of candidate cache lines and checking this set is likely to take longer than the delay associated with accessing an unopened page in memory. While FIG. 3 shows an example of a victim selection algorithm, the skilled person will appreciate that other algorithms that utilise the page open indication are possible. As well as taking account of open pages in memory, the cache controller 6 could also use other criteria, such as how recently a cache line has been used by the processor 2, or whether candidate cache lines are clean or dirty. These criteria could be given different levels of priority. Using a selection algorithm such as the one shown in FIG. 3, the cache controller 6 can discourage evicting data to memory pages that are not open, thus reducing the likely delay that is associated with cache line eviction.

Another cache management operation which can be made more efficient by using the present technique is a cache cleaning operation. Dirty cache lines will require a writeback to memory if they need to be evicted, whereas clean cache lines do not. Thus, the cache management can perform a cleaning operation where one or more dirty cache lines are returned to a clean state by writing the data back to memory, so that a write back is not necessary in the future. Using the present technique, the cache controller 6 can bias its selection of dirty cache lines for cleaning in response to the page open indication so that it is more probable that cleaning a selected cache line will involve write back to an open page than an unopen page. Thus, the delay arising from a write back will be reduced.

The cache cleaning operation could be performed in various ways. It is possible that the cache controller 6 performs the cache cleaning operation when it has free cycles in which it does not have another operation to perform. Thus, the cache controller 6 can obviate the need for a write back in the future, when there may be more demand on the cache controller's processing capacity and the associated memory page may have been closed. Thus, the cache controller 6 is used more efficiently.

Alternatively, the cache controller 6 may, while performing a normal cache lookup operation, detect from the tag information associated with a cache line and the page status information that a cache line is dirty and corresponds to an open page in memory. Thus, the cache controller could clean such cache lines when it encounters them, saving possible future processing.

Also, the cache controller 6 could regularly sweep the cache 4 in the background to clean the cache 4. One way of doing this is to use an index to ensure that all cache lines are checked periodically. The present technique could be incorporated so as to select cache lines associated with open pages in memory wherever possible (although the controller 6 may force cache lines corresponding to closed pages to be selected eventually, otherwise some cache lines may end up never being cleaned, effectively reducing the number of cache lines in the cache 4).

Figure 4:
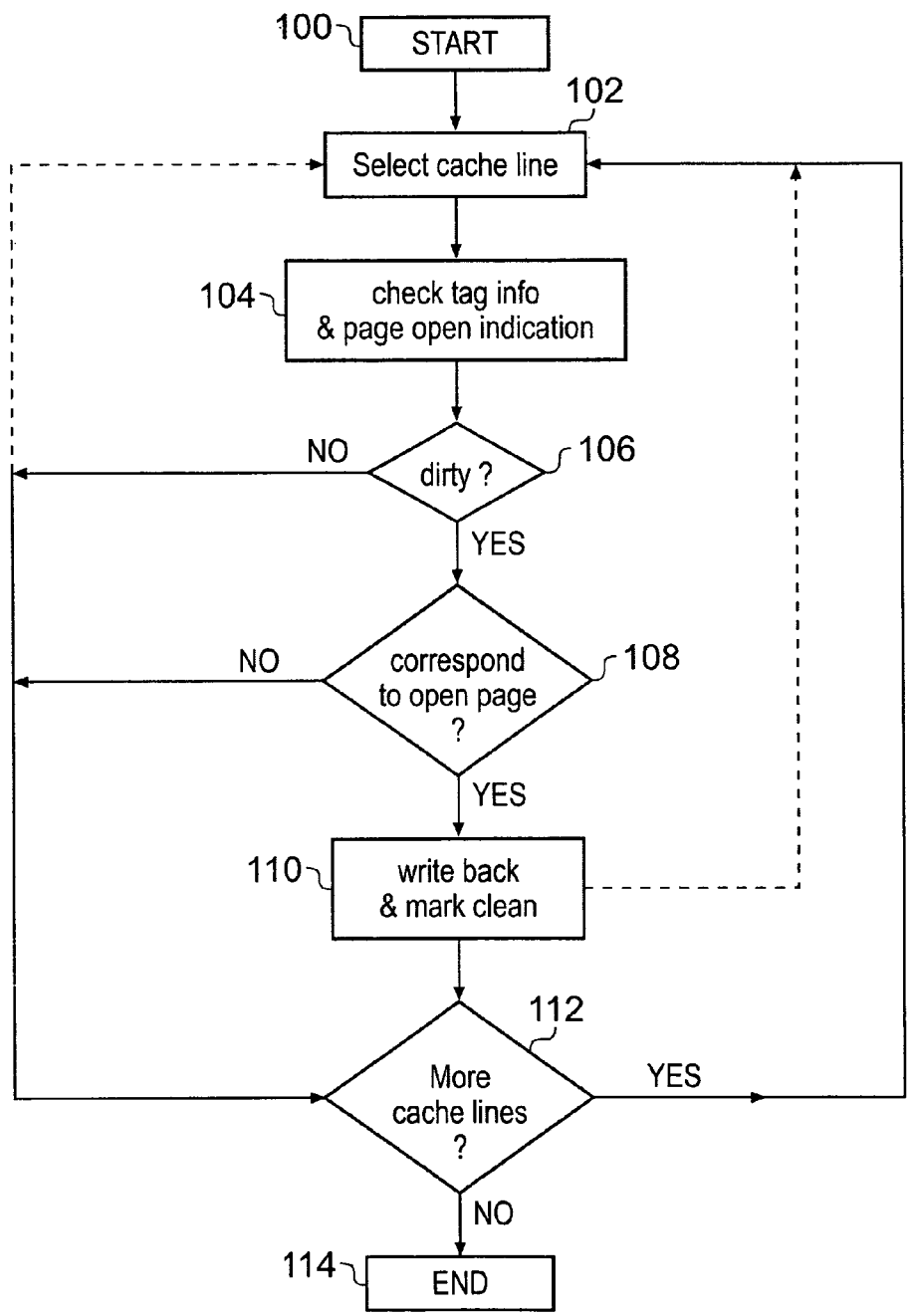
FIG. 4 shows a flow chart demonstrating an example of a cache cleaning operation according to the present technique.

FIG. 4 shows an example of a cache cleaning operation according to the present technique. The operation begins at step 100. At step 102 the cache controller 6 selects a candidate cache line from the cache 4. At step 104, the cache controller 6 checks the tag information associated with the selected cache line and the page open indication provided by the page status unit 40. At step 106, the cache controller 6 detects whether or not the selected cache line is dirty based on the tag information. If the cache line is found to be dirty, then at step 108 the cache controller 6 detects whether the page open indication indicates that the memory page indicated by the tag information as corresponding to the selected cache line is open. If the corresponding page in memory is indicated as being open, then at step 110 the cache controller 6 triggers a write back to memory and marks the cache line as clean. At step 112, the cache controller 6 detects whether there are any more cache lines to check. If there are, then flow returns to step 102 where the cache controller selects another cache line. If in step 106 the cache controller detects that the cache line is not dirty, or if in step 108 the cache controller 6 detects that the cache line does not correspond to a page indicated as open, then flow passes straight to step 112 (skipping step 110). If at step 112 the cache controller 6 detects that there are no more cache lines to check, then the process ends at step 114. Alternatively, the cache cleaning operation could be a continuous process, so that even if all the cache lines have been checked then the cache controller 6 continues checking the cache lines again. In this case, flow would return to step 102 after step 110 and if the result of steps 106 and 108 is NO (see the dotted lines in FIG. 4). By using a cache cleaning operation such as the example shown in FIG. 4, the cache controller 6 can reduce the likely delay associated with a write back, increasing the efficiency of the cache controller 6.

An example of a cache cleaning operation that uses the page open indication that indicates cache lines predicted to be open in the future is described as follows:

From a set of E lines that can be chosen for cleaning, the cache controller 6 picks a line L1 that is associated with page P1 in memory.

The page status unit 40 then sets the page open indication so that page P1 is predicted as being open in the future.

The cache controller 6 selects at least one additional line from the remainder of set E in accordance with the page open indication, giving preference to a line L2 that also targets page P1 (the page predicted as being open in the future) over lines LN that correspond to pages other than P1.

The cache controller 6 then groups or orders the data writes for lines L1 and L2 one after the other or in a burst transfer over the system bus. The memory controller 12 controls the write back to memory 10.

In this way, lines can be selected for cleaning in dependence upon the page open indication indicating which pages are predicted as being open in the future. The cache controller 6 could also bias its selection of lines to be cleaned so as to select two or more lines that access the same page by comparing the tag data associated with the cache lines.

In both the victim selection operation and the cache cleaning operation, the cache controller 6 uses the page open indication to bias its operations so that a memory access to an open page is more likely than to a page that is not open. The data processing system 1 could also be modified so that the cache controller 6 can make a quantitative prediction of how long the memory access will take, depending on the page open indication. This prediction can then be used to schedule operations to make more efficient use of the system resources. These techniques may also be used in full or partial combinations.

Figures 5, 6:
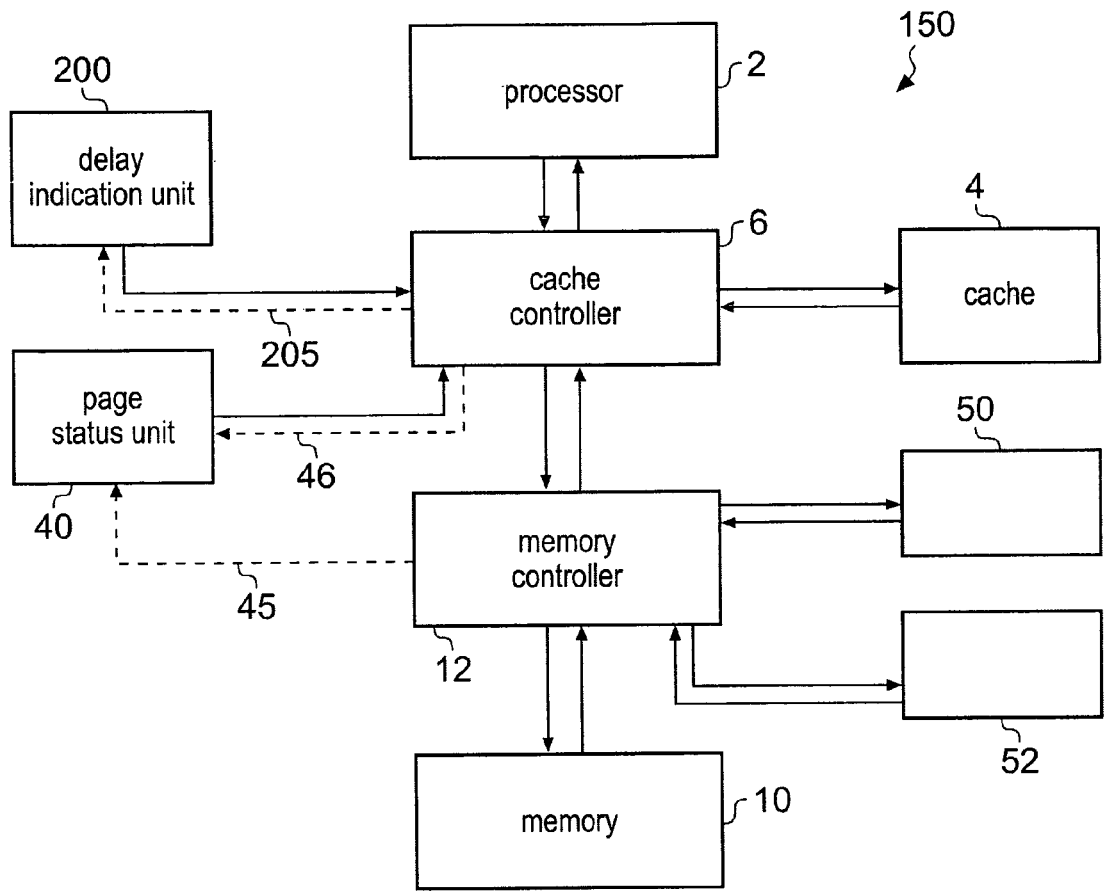
FIG. 5 schematically illustrates a data processing system that can predict how long memory accesses will take.
FIG. 6 illustrates an example of the information held in a delay indication unit.

FIG. 5 shows such a modified data processing system 150. Components shown in FIG. 5 that are the same as those in FIG. 1 have been labelled using the same reference numbers. The system 150 differs from the system 1 in that it also comprises a delay indication unit 200 coupled to the cache controller 6. The delay indication unit 200 provides the cache controller 6 with a delay indication value corresponding to the current access scenario. The cache controller 6 can use the delay indication value to make a prediction of how long the memory access will take. This prediction can be used by, for example, the processor to schedule its operations more efficiently.

The delay indication unit 200 can contain a number of entries, each entry corresponding to a different access scenario and containing a delay indication value. For example, FIG. 6 shows one possible implementation of the delay indication unit 200, in which there are two entries 210, 212 respectively corresponding to a page open scenario and a page not open scenario. Each entry has an associated delay indication value. The delay indication value for the page open scenario is smaller than for the page not open scenario. The cache controller 6 can select one of the entries of the delay indication unit 200 according to the page open indication. Alternatively, there could be more than two entries, for example with different entries corresponding different memory pages being accessed. In this case the cache controller 6 would also be responsive to other parameters when selecting an entry. The cache controller 6 makes a delay prediction based on the delay indication value of the selected entry.

The delay indication value could be provided in a variety of forms. One way could be as a binary encode count value indicating the number of clock cycles the specified access is predicted to take. The delay indication value could be hardwired, or programmable by software so that the user can program predicted delay values depending on the requirements of the system. Additionally, the delay indication values could be dynamically adjustable based on measurements of past accesses. For example, this dynamic adjustment could be performed by the cache controller 6 using data path 205 so that the predicted delay times are adapted to more accurately predict the actual delay.

Thus, the cache controller 6 can predict how long a memory access will take. If this information is provided to the processor, then the processor can reschedule its operations so that operations that make use of data fetched from memory are scheduled to be ready to process the data when the data is returned. Thus, the latency between the memory indicating completion of a memory access and the data being consumed by the processor 2 can be reduced.

This technique is particularly useful when the processor 2 has a processing pipeline for processing operations. The processing pipeline typically comprises a number of pipeline stages. Thus, the processor 2 can use the predicted delay time to schedule processing operations so that a processing operation that requires data from a memory access arrives at an execution stage where the data fetched from memory is consumed at the time at which the memory access is predicted to be complete. This can involve processing the operation in the pipeline stages preceding the execution stage where the data is consumed before the memory access is completed, so that the processor 2 does not have to wait for these preceding stages to be performed when the data is ready. For example, if the preceding pipeline stages are expected to take X cycles to complete, and the predicted delay value is Y cycles, then the processor 2 can start performing the processing of the preceding stages Y-X cycles after the memory access is triggered. This improves the efficiency of processing.

One situation where the predicted delay time can be useful is when a cache miss occurs. FIG. 7 shows a processing pipeline 250 employing a replay queue mechanism for dealing with cache misses. The processing pipeline 250 has a fetch stage 260, a decode stage 262, an issue stage 264, execute stages 266-0, 266-1 and 266-2 and a commit stage 268. While the pipeline in FIG. 7 is shown with three execute stages 266-0, 266-1 and 266-2, the skilled person will appreciate that there may be other numbers of execute stages. In the example of FIG. 7, the execute stage 266-1 is a stage where a data request is issued to the cache subsystem and the execute stage 266-2 is a stage where the data returned from the cache subsystem is consumed. If a processing operation triggers a cache miss, then the requested data will need to be fetched from memory. This causes a delay, and so the cache miss triggering processing operation (and possibly some subsequent operations that are dependent upon the result of the cache miss triggering operation) can be held in a replay queue 270 until the cache miss is resolved. While the cache miss triggering processing operation is held in the replay queue 270, other operations can be processed by the pipeline 250. This means that the processor 2 can reorder its operations to increase the throughput of the pipeline 250 and prevent the pipeline stalling in the event of a cache miss.

Some time later, the cache miss triggering operation is reissued at the issue stage 264 of the pipeline 250. If the cache miss triggering operation is not reissued until the cache controller 6 indicates that the data has been loaded into the cache 4, then there will be a delay while the cache miss triggering operation progresses through the pipeline up to the execution stage 266-2. The processor 2 can reduce this latency by being responsive to the delay time predicted by the cache controller 6 to reissue the cache miss triggering operation at a time such that the data is predicted to be ready by the time the cache miss triggering operation reaches the execution stage 266-2. The operation can be reissued while the memory access is still taking place. Preferably, the cache miss triggering operation will reach the execution stage 266-2 at the same time as the data is returned from the cache subsystem. Thus, the processor 2 can make use of the delay time predicted on the basis of the page open indication to schedule its operations more efficiently.

It is possible that the prediction of the delay time may not be correct. For example, there might be an error arising from an imprecise page open indication. This means that it is possible that the cache miss triggering operation will arrive at the execution stage 266-2 before the data has been returned. In this case, this operation can be placed again in the replay queue 270, so that other instructions can be processed. The cache controller could give an indication that a misprediction has occurred. If the delay indication unit 200 has dynamically adjustable delay indication values, then the system 150 may be able to adapt in response to past mispredictions to enable it to give a better prediction in the future. At some point in the future, the data will be returned, and so the operations held in the replay queue can be issued successfully through the processing pipeline 250.

The processor 2 can also make use of the predicted memory access delay time provided by the cache controller 6 when executing multiple threads of processing. FIG. 8 illustrates a pipeline 280 for a multithreading processor. The pipeline stages are similar to those of the pipeline 250 shown in FIG. 7 and have the same reference numbers. If a particular thread encounters a cache miss, then the operations for that thread are flushed from the pipeline 280 and the cache miss triggering thread enters a "pending" state. Thus, while the miss triggering thread is pending, the pipeline 280 can continue to process operations from other threads. Some time later, the thread exits the pending state and resumes execution.

The pipeline 280 includes a thread fetch status unit 290 that holds information about the threads. The thread fetch status unit 290 can record whether a thread is active (currently executing) or pending a cache miss, as well as the instruction address from which execution should restart when returning to the active state.

If the system waits until the cache controller 6 indicates that the cache miss has been resolved before restarting execution of the cache miss triggering thread, then there will be a delay while the instructions of that thread pass through the fetch 260, decode 262, issue 264 and execute stages 266-0 and 266-1 before the data can be consumed at stage 266-2. The processor 2 can make use of the predicted memory access delay time provided by the cache controller 6 and which is sensitive to whether a page is open or closed to select when the thread should exit the pending state. The operations from the cache miss triggering thread can be refetched at a time such that the operations will reach the stage 266-2 where the data is consumed by the time at which the data is predicted to be ready. Thus, the latency of the processing is reduced.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   a memory providing access to data values via one or more pages of data values, a memory access to a data value in a not open page triggering said not open page to be opened before said data value is accessed;
   a cache memory coupled to said memory and having a plurality of cache lines for caching data values stored in said memory;
   a cache controller configured to control said cache memory by performing one or more cache management operations; and
   a page status unit coupled to said cache controller and configured to provide a page open indication to said cache controller; wherein
   at least one of said one or more cache management operations performed by said cache controller is responsive to said page open indication provided by said page status unit.

2. A data processing apparatus according to claim 1, wherein said page open indication indicates one or more open pages of data values.

3. A data processing apparatus according to claim 2, wherein at least one of said one or more cache management operations performed by said cache controller is a victim selection operation responsive to said page open indication to select for eviction from said cache memory a victim cache line from among a plurality of candidate cache lines.

4. A data processing apparatus according to claim 3, wherein when selecting said victim cache line said cache controller is responsive to said page open indication to select a candidate cache line that is dirty and stores data values to be written back to a page indicated as open in preference to a candidate cache line that is dirty and stores data values to be written back to a page indicated as not open.

5. A data processing apparatus according to claim 3, wherein when selecting said victim cache line said cache controller is also responsive to at least one of:
   (i) how recently a candidate cache line has been used by said data processing apparatus; and
   (ii) whether a candidate cache line is clean or dirty.

6. A data processing apparatus according to claim 2, wherein at least one of said one or more cache management operations performed by said cache controller is a cache cleaning operation responsive to said page open indication to select at least one dirty cache line from among said plurality of cache lines and returning said dirty cache line to a clean state with respect to said memory.

7. A data processing apparatus according to claim 6, wherein when selecting said dirty cache line said cache controller is responsive to said page open indication to select a cache line that is dirty and stores data values to be written back to a page indicated as open in preference to a cache line that is dirty and stores data values to be written back to a page indicated as not open.

8. A data processing apparatus according to claim 7, wherein said cache controller performs said cache cleaning operation if while performing a cache lookup operation said cache controller detects at least one cache line that is dirty and stores data values to be written back to a page indicated as open.

9. A data processing apparatus according to claim 6, wherein said cache controller performs said cache cleaning operation when said cache controller does not have another cache management operation to perform.

10. A data processing apparatus according to claim 6, wherein said cache controller performs said cache cleaning operation by sweeping said cache lines periodically to check for dirty cache lines.

11. A data processing apparatus according to claim 2, further comprising a memory controller configured to control said memory, wherein said page status unit is coupled to said memory controller and maintains said page open indication by monitoring which pages have been opened when said memory controller responds to memory access requests.

12. A data processing apparatus according to claim 2, wherein said page status unit is coupled to said cache controller and maintains said page open indication by keeping a record of which of said plurality of pages have been opened by said memory on behalf of said cache controller.

13. A data processing apparatus according to claim 12, wherein:
    said memory is accessible by one or more devices other than said cache controller; and
    said page open indication gives an imprecise indication of which of said plurality of pages are open when said memory opens one or more pages in response to memory accesses from said one or more devices.

14. A data processing apparatus according to claim 13, wherein said page status unit is also responsive to memory accesses from said one or more devices to maintain said page open indication.

15. A data processing apparatus according to claim 2, wherein said page open indication gives an imprecise indication of one or more open pages of data values.

16. A data processing apparatus according to claim 15, wherein said page open indication is generated using a hash function performed upon addresses of open pages.

17. A data processing apparatus according to claim 15, wherein said page open indication gives an imprecise indication of which of said plurality of pages are open when there is a time lag between a page being opened or closed and said page status information indicating said page being opened or closed being received from said page status unit by said cache controller.

18. A data processing apparatus according to claim 2, further comprising:
    processing circuitry configured to perform a sequence of processing operations, wherein:
    at least one of said one or more cache management operations performed by said cache controller is a memory access delay prediction operation responsive to said page open indication to predict a delay time required for a memory access to be completed; and said processing circuitry schedules at least some processing operations in dependence upon said delay time predicted by said cache controller.

19. A data processing apparatus according to claim 18, further comprising a delay indication unit coupled to said cache controller for providing a delay indication value in response to said page open indication.

20. A data processing apparatus according to claim 19, wherein said delay indication unit has a plurality of entries each containing a delay indication value corresponding to a respective access scenario and said cache controller selects one of said entries in response to said page open indication to predict said delay time.

21. A data processing apparatus according to claim 20, wherein said delay indication value is a value indicating the number of cycles a memory access is predicted to take.

22. A data processing apparatus according to claim 20, wherein said plurality of entries contain hardwired delay indication values.

23. A data processing apparatus according to claim 20, wherein said plurality of entries contain programmable delay indication values.

24. A data processing apparatus according to claim 20, wherein said plurality of entries contain delay indication values which may be dynamically adjusted based on measured delay times of previous memory accesses.

25. A data processing apparatus according to claim 20, wherein said delay indication unit has two entries respectively corresponding to a page open scenario and a page not open scenario.

26. A data processing apparatus according to claim 18, wherein said processing circuitry comprises a processing pipeline comprising a plurality of pipeline stages and said processing circuitry schedules said processing operations such that a processing operation that consumes data is predicted to reach an execution stage where the data fetched from memory is consumed by the time that said memory access is complete.

27. A data processing apparatus according to claim 26, wherein:

a cache miss triggering processing operation that triggers a cache miss is placed in a replay queue; and said processor is responsive to said predicted delay time to reissue said cache miss triggering processing operation at an issue stage of said processing pipeline at a time such that said cache miss triggering processing operation is predicted to reach said execution stage of said processing pipeline by the time that said memory access is predicted as being complete.

28. A data processing apparatus according to claim 27, wherein at least some processing operations subsequent to said cache miss triggering processing operation are executed while said cache miss triggering processing operation is held in said replay queue.

29. A data processing apparatus according to claim 27, wherein if said memory access is not complete when said cache miss triggering processing operation reaches said execution stage of said processing pipeline then said cache miss triggering processing operation is placed in said replay queue again.

30. A data processing apparatus according to claim 26, wherein:

said processor is configured to perform processing operations from a plurality of threads of processing;

if a processing operation from one thread triggers a cache miss then said one thread enters a pending state and said processor performs processing operations from another thread; and said one thread exits said pending state at a time dependent upon said delay time predicted by said cache controller.

31. A data processing apparatus according to claim 30, wherein when said one thread enters said pending state then processing operations from said one thread are flushed from said processing pipeline.

32. A data processing apparatus according to claim 30, wherein said one thread exits said pending state when processing operations of said one thread are refetched into a fetch stage of said processing pipeline at a time such that said processing operations are predicted to reach said execution stage of said processing pipeline by the time that said memory access is predicted as being complete.

33. A data processing apparatus according to claim 1, wherein said page open indication indicates one or more pages that are predicted to be open in the future.

34. A data processing apparatus according to claim 1, wherein said page open indication indicates one or more of said plurality of cache lines that correspond to one of:
a currently open page; and
a page that is predicted to be open in the future.

35. A data processing apparatus according to claim 1, further comprising a memory controller configured to control said memory; wherein:

said memory controller uses a first addressing system to identify memory locations within said memory;

said cache controller uses a second addressing system to identify memory locations within said memory; and at least one of said memory controller, said page status unit, and said cache controller performs a mapping between addresses in said first addressing system and addresses in said second addressing system so that said cache controller can identify cache lines that correspond to a page indicated by said page open indication.

36. A data processing method comprising the steps of:

providing access to data values stored in a memory via one or more pages of data values, a memory access to a data value in a not open page triggering said not open page to be opened before said data value is accessed;

caching at least some of said data values stored in said memory in a cache memory having a plurality of cache lines;

controlling said cache memory by performing one or more cache management operations using a cache controller; and providing a page open indication to said controlling step; wherein at least one of said one or more cache management operations performed by said controlling step is responsive to said page open indication provided in said providing step.

37. A data processing apparatus comprising:

memory means for providing access to data values via one or more pages of data values, a memory access to a data value in a not open page triggering said not open page to be opened before said data value is accessed;

cache memory means coupled to said memory means having a plurality of cache lines for caching data values stored in said memory;

cache controlling means for controlling said cache memory means by performing one or more cache management operations; and page status means coupled to said cache controlling means for providing a page open indication to said cache controlling means; wherein at least one of said one or more cache management operations performed by said cache controlling means is responsive to said page open indication provided by said page status means.

* * * * *